United States Patent
Inaba

(10) Patent No.: US 10,189,101 B2
(45) Date of Patent: Jan. 29, 2019

(54) WIRE ELECTRIC DISCHARGE MACHINE WITH AUTOMATIC WIRE CONNECTING FUNCTION

(71) Applicant: FANUC Corporation, Yamanashi (JP)

(72) Inventor: Harutora Inaba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 876 days.

(21) Appl. No.: 14/228,834

(22) Filed: Mar. 28, 2014

(65) Prior Publication Data
US 2014/0291294 A1   Oct. 2, 2014

(30) Foreign Application Priority Data

Mar. 29, 2013 (JP) ................. 2013-074271

(51) Int. Cl.
| | | |
|---|---|---|
| B23H 1/00 | (2006.01) | |
| B23H 7/06 | (2006.01) | |
| B23H 7/10 | (2006.01) | |

(52) U.S. Cl.
CPC ........... B23H 1/00 (2013.01); B23H 7/06 (2013.01); B23H 7/102 (2013.01)

(58) Field of Classification Search
CPC ... B23H 7/06; B23H 7/08; B23H 7/10; B23H 7/102; B23H 7/26
USPC ............ 219/69.11, 69.12, 69.17; 226/11, 44
See application file for complete search history.

(56) References Cited

U.S. PATENT DOCUMENTS

| | | | | | |
|---|---|---|---|---|---|
| 3,987,270 | A | * | 10/1976 | Ullmann | B23H 7/102 219/69.12 |
| 4,547,647 | A | * | 10/1985 | Schneider | B23H 7/102 219/69.12 |
| 4,778,972 | A | * | 10/1988 | Josserand | B23H 7/102 204/206 |
| 5,003,147 | A | * | 3/1991 | Kawanabe | B23H 7/06 219/69.12 |
| 5,055,649 | A | | 10/1991 | Iwasaki et al. | |

(Continued)

FOREIGN PATENT DOCUMENTS

| | | |
|---|---|---|
| CN | 1605423 A | 4/2005 |
| CN | 102114560 A | 7/2011 |

(Continued)

OTHER PUBLICATIONS

JP H08-25146 A Machine Translation (Dec. 2015).*

(Continued)

*Primary Examiner* — Dana Ross
*Assistant Examiner* — Joe E Mills, Jr.
(74) *Attorney, Agent, or Firm* — Hauptman Ham, LLP

(57) ABSTRACT

A wire electrode is hung from an upper die guide of a wire electric discharge machine toward a workpiece, a distance from a position where the wire electrode on the top surface of the workpiece is hung down to a top end position of a machined groove formed by the electric discharge machining is calculated based on a commanded taper angle and the distance from the top surface of the workpiece to an upper die guide fulcrum position of the upper die guide, and automatic wire connection is performed by moving an upper nozzle by the calculated distance. In this way, a wire connecting operation can be performed in the vicinity of the tapered groove.

2 Claims, 8 Drawing Sheets

(56) References Cited

U.S. PATENT DOCUMENTS

| | | | | |
|---|---|---|---|---|
| 5,126,524 A | * | 6/1992 | Moro | B23H 7/105 219/69.12 |
| 5,338,912 A | * | 8/1994 | Iwasaki | B23H 7/10 219/69.12 |
| 5,573,681 A | * | 11/1996 | Ishibashi | B23H 7/065 219/69.12 |
| 5,834,726 A | * | 11/1998 | Drouet | B23H 7/065 219/69.12 |
| 5,852,269 A | * | 12/1998 | Toyonaga | B23H 7/065 219/69.12 |
| 6,201,205 B1 | * | 3/2001 | Oshio | B23H 7/102 219/69.12 |
| 7,294,806 B2 | * | 11/2007 | Martin | B23H 7/065 219/69.12 |
| 2005/0072760 A1 | * | 4/2005 | Abe | B23H 7/02 219/69.12 |
| 2008/0142487 A1 | * | 6/2008 | Sakaguchi | B23H 7/102 219/69.12 |
| 2008/0290071 A1 | * | 11/2008 | Arakawa | B23H 7/06 219/69.12 |
| 2012/0312786 A1 | | 12/2012 | Arakawa et al. | |

FOREIGN PATENT DOCUMENTS

| | | | |
|---|---|---|---|
| EP | 2340907 A2 | | 7/2011 |
| JP | 58109229 A | | 6/1983 |
| JP | 6263018 A | | 3/1987 |
| JP | 63127830 A | | 5/1988 |
| JP | 6451229 A | | 2/1989 |
| JP | 2311221 A | | 12/1990 |
| JP | H05212623 A | | 8/1993 |
| JP | H05337743 A | | 12/1993 |
| JP | 6226543 A | | 8/1994 |
| JP | 825146 A | | 1/1996 |
| JP | 08025146 A | * | 1/1996 |
| JP | 9108950 A | | 4/1997 |
| JP | 09108950 A | * | 4/1997 |
| JP | 10180547 A | | 7/1998 |
| JP | 2000218440 A | * | 8/2000 |
| JP | 2004160570 A | | 6/2004 |
| JP | 2006231417 A | | 9/2006 |
| JP | 2012130973 A | | 7/2012 |

OTHER PUBLICATIONS

Extended European Search Report dated Nov. 17, 2014, corresponding to European patent application No. 14162171.4.

Office Action dated Jul. 15, 2014, corresponding to Japanese patent application No. 2013-074271.

Office Action dated Jul. 24, 2015, corresponding to Chinese patent application No. 201410126504.8.

* cited by examiner

WIRE ELECTRIC DISCHARGE MACHINE WITH AUTOMATIC WIRE CONNECTING FUNCTION

RELATED APPLICATIONS

The present application claims priority to Japanese Application Number 2013-074271, filed Mar. 29, 2013, the disclosure of which is hereby incorporated by reference herein in its entirety.

BACKGROUND OF THE INVENTION

Field of the Invention

The present invention relates to a wire electric discharge machine with an automatic wire connecting function, capable of repairing breakage in the vicinity of a breakage position.

Description of the Related Art

In a wire electric discharge machine, a wire electrode may sometimes be broken while a workpiece is being machined. An automatic wire connecting function to reconnect the broken wire electrode is a known technique to solve this problem (e.g., Japanese Patent Applications Laid-Open Nos. 5-212623 and 5-337743).

In taper machining based on wire electric discharge machining such that a workpiece is inclined at a certain angle as it is machined by a wire electrode, unexpected breakage of the wire electrode may intermittently occur depending on difficulties in the machining shape, machining conditions, physical properties of the material of the workpiece, etc.

To overcome this, a wire electric discharge machine has an automatic wire connecting function such that a storage device attached to its controller is stored with a program for breakage repair in the vicinity of a breakage position. Based on the automatic wire connecting function, breakage repair processes are performed according to the preset program. The processes include breakage during machining, wire electrode rewinding, wire electrode tip cutting, wire connecting operation in the vicinity of the breakage position, completion of the wire connection, and restart of the machining, which occur or are carried out in the order named. In this way, the breakage repair can be performed in the vicinity of the breakage position without returning to a machining start point.

Even by the use of the conventional wire electric discharge machine, breakage of the wire electrode that occurs during taper machining can be repaired in the vicinity of the breakage position by the automatic wire connecting function. According to the prior art technique, however, the connection success rate of the breakage repair in the vicinity of the breakage position during the taper machining is drastically degraded as a taper angle and the distance between the respective Z-axis positions (heights) of the top surface of a workpiece and an upper die guide fulcrum increase. Therefore, the taper angle that ensures satisfactory wire connection in the vicinity of the breakage position during the taper machining by means of the automatic wire connecting function is limited to a small value.

SUMMARY OF THE INVENTION

Accordingly, in view of the problem of the prior art described above, the object of the present invention is to provide a wire electric discharge machine with an automatic wire connecting function, capable of repairing breakage even with a larger angle in the vicinity of a breakage position by means of a breakage repair function.

In a first aspect of a wire electric discharge machine with an automatic wire connecting function according to the present invention, the wire electric discharge machine comprises an upper nozzle and a lower nozzle which support a wire electrode and in which an upper die guide and a lower die guide are included, respectively, and the wire electrode and a workpiece are moved relative to each other to machine the workpiece. And if the wire electrode is broken during machining, then the wire electrode is guided for automatic wire connection by a working fluid injected through a nozzle hole of the upper nozzle. The wire electric discharge machine comprises: upper die guide fulcrum position acquisition unit that acquires a distance from a top surface of the workpiece to an upper die guide fulcrum position of the upper die guide; deviation calculation unit that calculates, as a deviation, a distance from a position on the top surface of the workpiece where the wire electrode is hung from the upper die guide to a top end position of a machined groove formed by the machining, based on a commanded taper angle and the distance from the top surface of the workpiece to the upper die guide fulcrum position; and automatic wire connection execution unit that moves the upper nozzle by a distance equivalent to the calculated deviation, thereby performing the automatic wire connection.

The upper die guide fulcrum position acquisition unit may be a distance meter configured to measure the distance from the top surface of the workpiece to the upper die guide fulcrum position.

The upper die guide fulcrum position acquisition unit may be configured to acquire the distance from the top surface of the workpiece to the upper die guide fulcrum position based on an amount of delivery of the wire electrode when the tip of the wire electrode, which is hung from the upper die guide fulcrum position toward the top surface of the workpiece, touches the wire electrode.

The wire electric discharge machine may further comprise a storage device previously stored with the deviation corresponding to the commanded taper angle and the distance from the top surface of the workpiece to the upper die guide fulcrum position, wherein the deviation is acquired by reading the deviation stored in the storage device based on the commanded taper angle and the distance from the top surface of the workpiece to the upper die guide fulcrum position.

In a second aspect of a wire electric discharge machine with an automatic wire connecting function according to the present invention, the wire electric discharge machine comprises an upper nozzle and a lower nozzle which support a wire electrode and in which an upper die guide and a lower die guide are included, respectively, and the wire electrode and a workpiece are moved relative to each other to machine the workpiece. And if the wire electrode is broken during machining, then the wire electrode is guided for automatic wire connection by a jet stream injected through a nozzle hole of the upper nozzle. The wire electric discharge machine comprises: deviation acquisition unit that acquires, as a deviation, a distance from a position on the top surface of the workpiece where the wire electrode is hung from the upper die guide to a top end position of a machined groove formed by the machining, and automatic wire connection execution unit that moves the upper nozzle by a distance equivalent to the acquired deviation, thereby performing the automatic wire connection.

The deviation acquisition unit may cause the upper nozzle to move on a projection, on the top surface of the workpiece, of an imaginary line which connects an upper die guide fulcrum position of the upper die guide and a lower die guide fulcrum position of the lower die guide, while intermittently moving the wire electrode up and down, and a distance between a position where a delivery of the wire electrode is changed and a position corresponding to the upper die guide fulcrum position on the projection on the top surface of the workpiece is acquired as the deviation.

The deviation acquisition unit may comprise pressure detection unit that detects a pressure of the jet stream injected from the upper nozzle and causes the upper nozzle to move along a projection, on the top surface of the workpiece, of an imaginary line which connects an upper die guide fulcrum position of the upper die guide and a lower die guide fulcrum position of the lower die guide, and a distance between a position where the pressure from the pressure detection means is changed and a position corresponding to the upper die guide fulcrum position on the projection on the top surface of the workpiece is acquired as the deviation.

The upper nozzle and the workpiece may be relatively moved in the direction of inclination of the machined groove in synchronism with threading of the wire electrode into the machined groove in performing the automatic wire connection. Alternatively, the wire electrode may be automatically connected after the upper nozzle is raised for a predetermined distance in performing the automatic connection. Further, the automatic wire connection may be performed in a breakage position of the wire electrode or a position retracted a short distance along a machining trajectory from the wire electrode breakage position.

According to the present invention, there can be provided a wire electric discharge machine with an automatic wire connecting function, capable of repairing breakage even with a larger angle in the vicinity of a breakage position by means of a breakage repair function.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
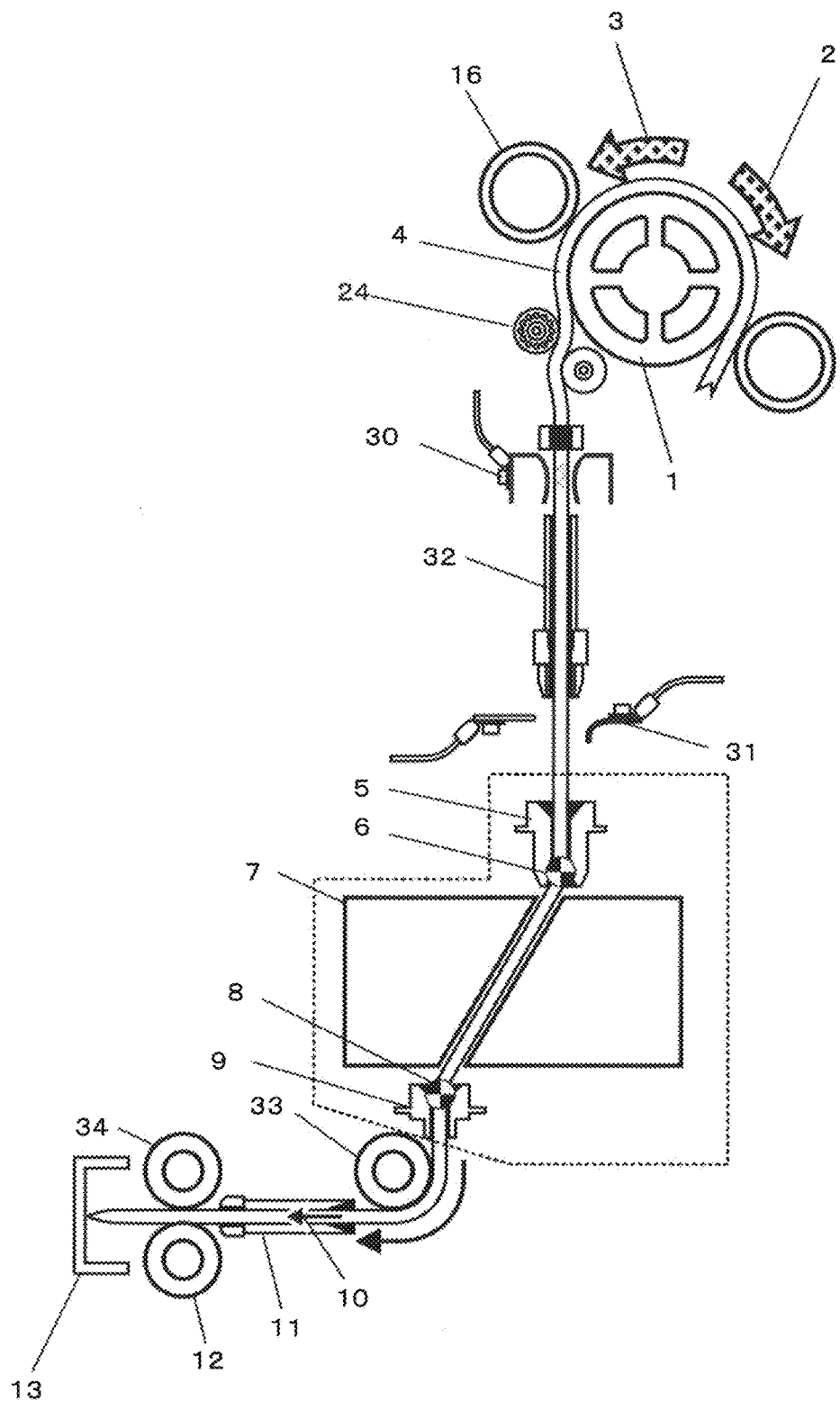
FIG. 1 is a view illustrating an outline of an operation for connecting a broken wire electrode in the vicinity of a breakage position in taper machining.

An operation for connecting a broken wire electrode in the vicinity of a breakage position in taper machining by a wire electric discharge machine according to the present invention will be described with reference to FIGS. 1 and 2.

In the wire electric discharge machine capable of taper machining, a table (not shown) on which a workpiece 7 is placed is horizontally movable relative to a wire electrode 4 in X- and Y-axis directions. Further, an upper arm (not shown) with an upper nozzle 36 including an upper die guide 5 is movable in a U-axis direction (parallel to the X-axis direction) and a V-axis direction (parallel to the Y-axis direction). An alternative arrangement is possible such that the upper arm and the upper die guide 5 are movable in a Z-axis direction and the vertical Z-axis direction, respectively. The configuration of the wire electric discharge machine is a conventional one.

An outline of conventional processes for automatic connection of the wire electrode 4 will be described first. The automatic wire connection in wire electric discharge machining comprises processes of wire electrode cutting due to breakage or for the next machining operation, rewinding, wire electrode tip cutting, wire connecting operation, repeated retry in case of a failure, wire connection using upper and lower die guides, and wire connection detection by a connection detection plate.

The automatic wire connection is roughly composed of two steps. In one of these steps, the tip of the wire electrode 4 is cut in order to eliminate its bending due to breakage during workpiece machining or scratches on the surface of the wire electrode 4 that is easily caught by upper and lower die guides 5 and 9, which hold the wire electrode 4 from above and below the workpiece 7. In this way, the reproduced tip of the wire electrode 4 can be neat (that is, straight and smooth-surfaced) enough for smooth connection.

In a wire electrode cutting operation, the wire electrode 4 to be annealed is clamped by means of a pair of current-carrying electrodes (upper and lower cutting electrodes 30 and 31) that are arranged above and below an automatic wire connection unit (not shown).

Thereafter, the wire electrode 4 is energized with annealing torque and annealed by electric resistance heating. Then, the tip of the wire electrode 4 is cut with cutting start torque produced in a wire electrode rewinding direction 2 by a brake roller 1 that is controlled by a controller 50. Cutting air that is injected into an automatic wire feed (AWF) pipe 32 around the same time has important functions of settling a cutting position for the wire electrode 4 and stabilizing the straightness of the cut wire electrode 4.

The automatic connection of the wire electrode 4 having undergone the tip cutting is completed as the cut tip is sequentially transferred from the upper die guide 5 to a connection detection plate 13 through the workpiece 7, the lower die guide 9, a guide roller 33, a lower pipe 11, and a feed unit (pinch and feed rollers 34 and 12).

Figure 2:
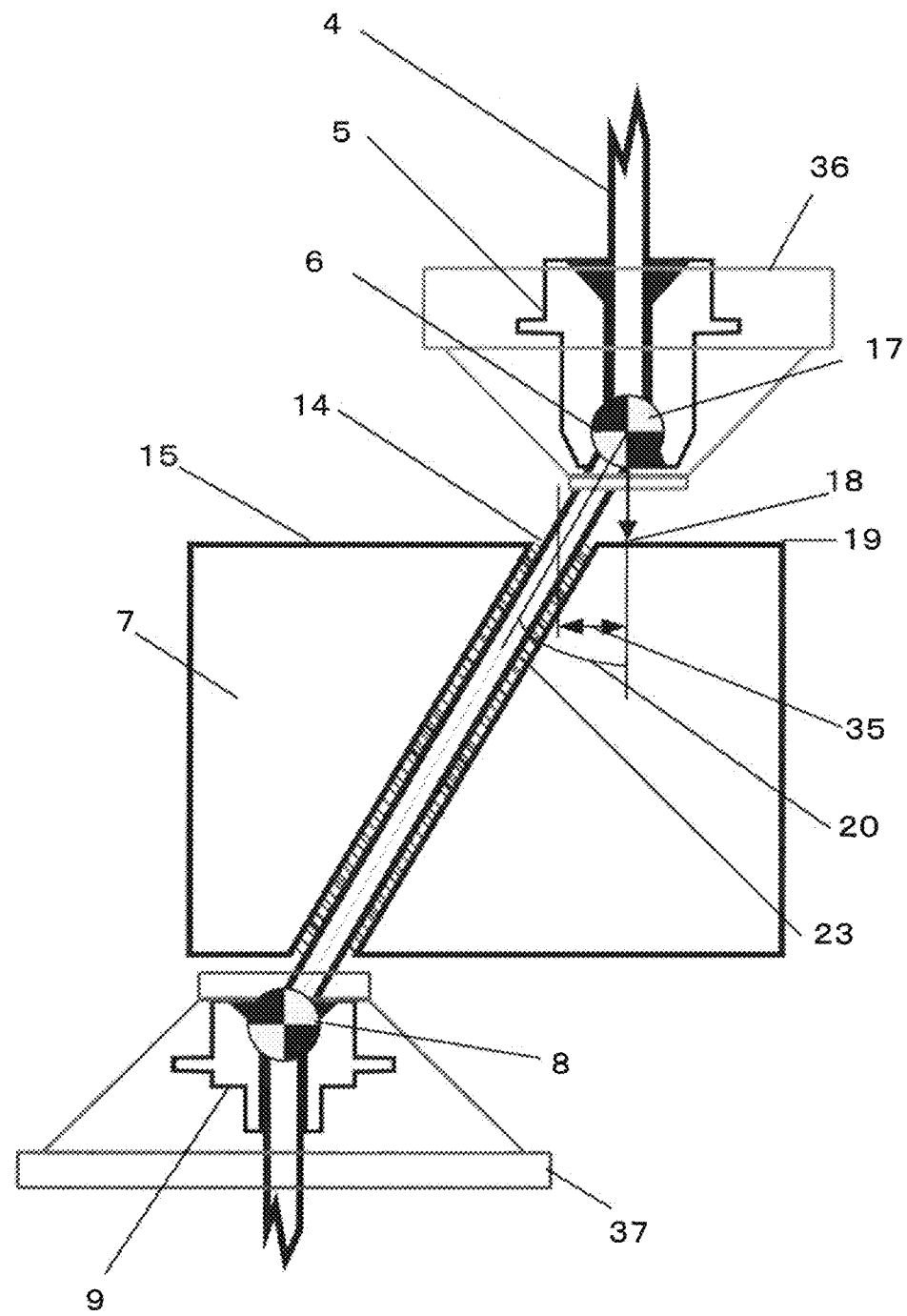
FIG. 2 is a view illustrating a part surrounded by a broken line in FIG. 1.

In FIG. 1, reference numerals 16 and 24 denote a pinch roller and a tension pulley, respectively.

Figure 3:
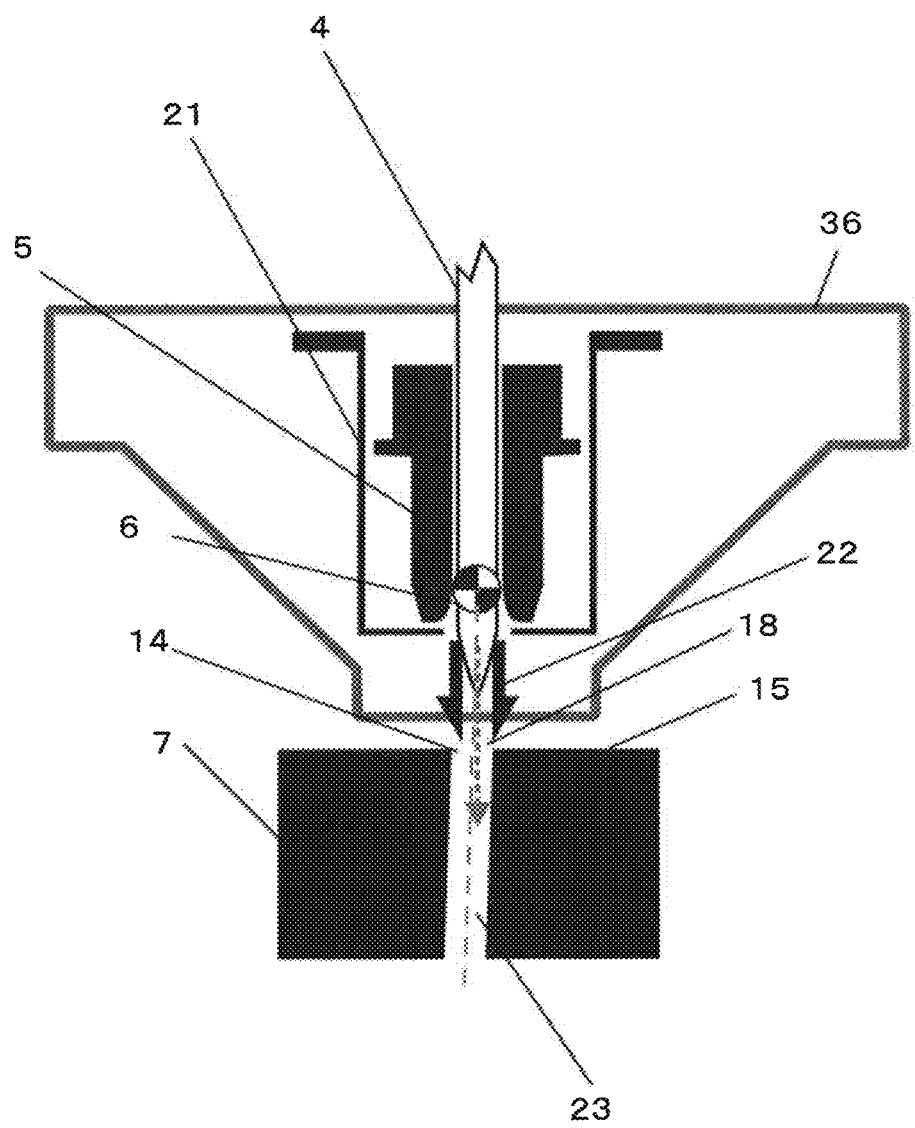
FIG. 3 is a view illustrating a die guide fulcrum position movement compensating function with a small taper angle.
Figure 4:
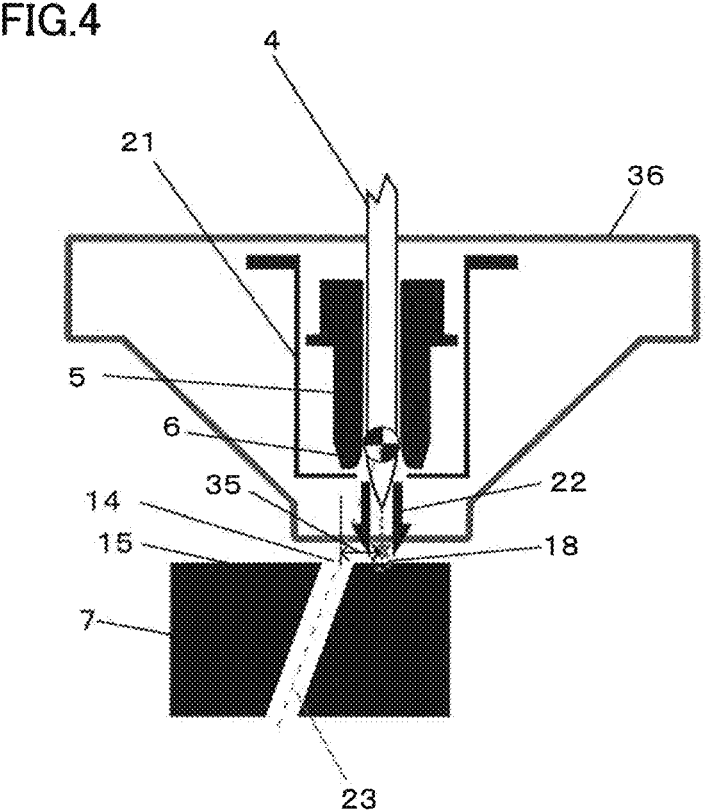
FIG. 4 is a view illustrating the die guide fulcrum position movement compensating function with a large taper angle in a state before an upper nozzle (upper die guide fulcrum position) is moved.
Figure 5:
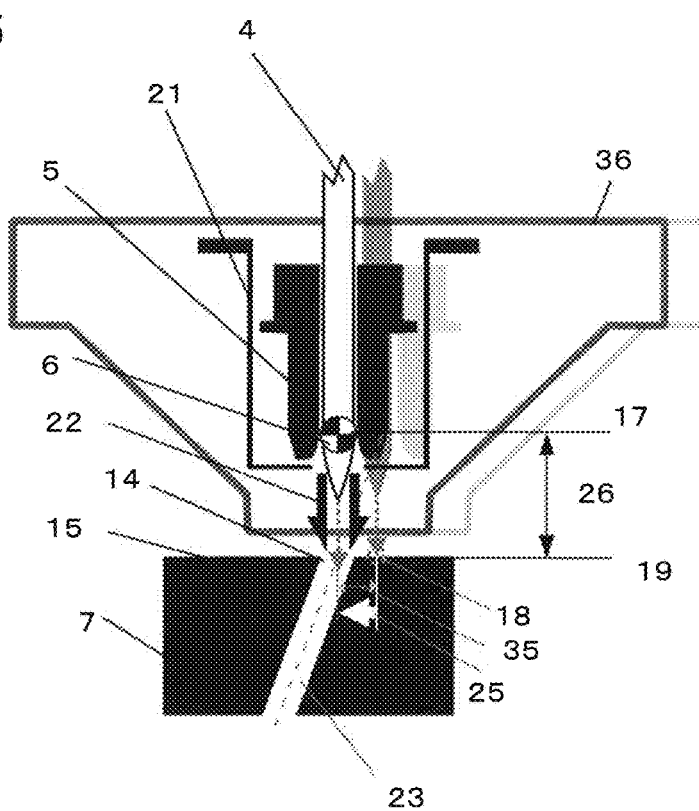
FIG. 5 is a view illustrating the die guide fulcrum position movement compensating function with the large taper angle in a state after the upper nozzle (upper die guide fulcrum position) is moved.

An automatic wire connecting function for the wire electrode performed by the wire electric discharge machine according to the present invention will now be described with reference to FIGS. 3 and 4. This function is based on an improvement of conventional automatic connection steps for a wire electrode. FIG. 3 is a view illustrating a die guide fulcrum position movement compensating function for the case where the taper angle is small. FIGS. 4 and 5 are views illustrating the die guide fulcrum position movement compensating function for the case where the taper angle is large. FIGS. 4 and 5 show the states of the upper nozzle 36 (an upper die guide fulcrum position 6) before and after movement, respectively.

In one process of the automatic wire connection according to the present invention, a wire tip processing operation is performed after the upper and lower die guides are moved close to the breakage position.

Then, the wire electrode 4 is rewound in the wire electrode rewinding direction 2 by the servo-controlled brake roller 1 that controls feeding and rewinding operations for the wire electrode 4.

Subsequently, the tip of the wire electrode 4 is cut. The tip or a near-tip portion of the wire electrode 4 is fractured or bent by an elastic reaction force based on machining tension produced when the electrode is broken. The tip of the wire electrode 4 is cut with an optimum cutting torque that is produced as the wire electrode 4 is straightened by annealing or by a take-up operation of the brake roller 1. Thus, the wire electrode 4 is given a tip shape with high straightness and connectability, whereupon its cutting is completed. Then, a working fluid is discharged from a working tank (not shown) so that the fluid level of the tank is lowered to the height of a machined groove top end 14 in the vicinity of the breakage position of a workpiece top surface 15. This drainage allows the wire electrode 4 to be effectively guided to the machined groove top end 14 by an upper jet stream 22 produced by a jet nozzle 21 (FIGS. 3, 4 and 5) of the upper nozzle 36.

Subsequently, a wire connection process to automatically connect the wire electrode 4 in the vicinity of the breakage position of the workpiece top surface 15 is performed in the following manner.

Breakage repair in the vicinity of the breakage position using the wire electric discharge machine according to the present invention is a wire connecting operation performed as the wire electrode 4 is passed through a taper-machined groove 23, starting at the upper die guide fulcrum position 6 of the upper die guide 5 and ending with wire connection at a lower die guide fulcrum position 8 of the lower die guide 9. Thus, as the wire electrode 4 is fed in a wire electrode feeding direction 3 (FIG. 1) at an appropriate rotational speed of the servo-controlled brake roller 1, the wire electrode straightened by the cutting operation is hung down around the machined groove top end 14 of the workpiece top surface 15 to be connected.

The tip of the wire electrode 4 is inserted through the machined groove top end 14 into the taper-machined groove 23 and passed through the lower die guide fulcrum position 8, taking advantage of the straightness of the wire electrode 4 obtained by the cutting operation and the upper jet stream 22 that maintains the straightness and traveling direction of the wire electrode. Then, the wire electrode 4 is guided in the lower pipe 11 by a water-flow effect of a lower jet 10, and the passage of the wire electrode 4 through the feed roller 12 is detected by the connection detection plate 13. The feed roller 12 operates in synchronism with the brake roller 1, thereby applying appropriate machining tension to the wire electrode 4, and is driven by a servomotor (not shown). Thereupon, the wire connection process ends and the wire electrode 4 returns to the upper and lower die guide fulcrum positions 6 and 8 at the time of breakage. Thereafter, injection into the working tank is completed so that the electric discharge machining can be restarted, and the breakage repair in the vicinity of the breakage position is completed. Thus, the operation for the automatic connection of the wire electrode 4 ends.

The following is a description of execution positions for the automatic wire connection. If the wire electrode 4 is broken during the electric discharge machining, it is connected by (a) a method of automatic wire connection at a machining start hole (corresponding to Steps SA05 to SA08 of FIG. 10), (b) a method of automatic wire connection in, for example, a position intermediate between the breakage position of the wire electrode 4 and a starting point of a machining block in which the wire electrode 4 is broken, or (c) a method of automatic wire connection in the breakage position of the wire electrode or a position retracted a short distance along a machining trajectory from the wire electrode breakage position (where the wire electrode is broken on a machining path).

The automatic connection of the wire electrode described above is performed in the same manner as the conventional automatic wire connection. The following is a description of the causes of such a phenomenon that the connection success rate is drastically degraded as a machining taper angle 20 and an open distance of the upper die guide 5 from a Z-axis height 19 of the workpiece top surface to a Z-axis direction position (height) 17 of the upper die guide fulcrum increase. The open distance of the upper die guide 5 is equal to a height 26 from the workpiece top surface to the upper die guide fulcrum position 6 shown in FIG. 5. This phenomenon occurs when the breakage is repaired during the taper machining.

The causes of such drastic degradation of connection success rate in an automatic connection operation during a taper machining can be considered as described below. In the taper machining, the upper and lower die guide fulcrum positions 6 and 8 of the upper and lower die guides 5 and 9 are moved in response to program commands, and the workpiece 7 is inclined at an arbitrary angle to the vertical direction as it is machined.

Accordingly, (a) a deviation 35 (FIGS. 2 to 4) of a wire electrode hanging position 18 from the machined groove top end 14 of the workpiece 7 and the upper die guide fulcrum position 6 on an extension of the wire electrode 4 inclined at the taper angle 20, on the workpiece top surface 15, increases as the taper angle 20 increases, (b) the deviation 35 of the wire electrode hanging position 18 from the machined groove top end 14 of the workpiece top surface 15 and the upper die guide fulcrum position 6 on the extension of the wire electrode 4 inclined at the taper angle 20, on the workpiece top surface 15, increases as a nozzle opening distance 29 (FIG. 8) between the workpiece 7 and the upper die guide 5 increases, or (c) the deviation 35 of the wire electrode hanging position 18 on the workpiece top surface 15 increases based on a composite action of the causes (a) and (b) described above.

Due to any of the above-described causes (a) to (c), the effect of guided insertion of the wire electrode 4 into the taper-machined groove 23 by means of the inherent flexibility of the wire electrode and the upper jet stream 22 is gradually reduced. Finally, this guidance effect completely disappears without regard to the diameter of the wire electrode 4 when the deviation 35 exceeds a certain value. Thus, the wire electrode 4 hanging from the upper die guide fulcrum position 6 collides with the workpiece top surface 15, so that it is difficult to thread the wire electrode 4 through the machined groove top end 14.

Accordingly, the electric discharge machine with an automatic wire connecting function according to the present invention has a die guide fulcrum position movement compensating function (FIGS. 4 and 5) such that it obtains the deviation 35 on the workpiece top surface 15 between the wire electrode hanging position 18 and the machined groove top end 14 of the workpiece top surface 15, which causes the difficulty in connection at the machined groove top end 14 in the breakage repair in the vicinity of the breakage position, for example, then moves the upper die guide fulcrum position 6 of the upper nozzle 36 in the Z-axis direction to a position above the machined groove top end 14, with the obtained deviation 35 used as a connection start position movement compensation value for the breakage repair in the vicinity of the breakage position in the taper machining, and hangs the wire electrode 4 in the moved position. Based on this function, degradation of the connectability due to an increase in the machining taper angle 20 can be suppressed.

The following is a description of a method of obtaining the deviation 35 on the workpiece top surface 15 between the wire electrode hanging position 18 and the machined groove top end 14 of the workpiece top surface 15 during the breakage repair in the vicinity of the breakage position.

(1) A distance meter, such as a laser range finder, is attached to an upper structure part (not shown) on which the upper nozzle 36 is mounted, whereby the distance between the workpiece top surface 15 and the upper die guide fulcrum position 6 is measured. The deviation 35 is calculated based on the obtained distance and a taper angle commanded by a machining program or the like.

A storage device of the wire electric discharge machine may be previously stored with the deviation corresponding to the commanded taper angle and the distance from the workpiece top surface 15 to the upper die guide fulcrum position 6 so that the deviation 35 can be acquired by reading the deviation stored in the storage device, based on the commanded taper angle and the distance between the workpiece top surface 15 and the upper die guide fulcrum position 6.

(2) The wire electric discharge machine has the function of detecting the time of contact of the tip of the wire electrode 4 with the workpiece 7, as well as the function of measuring the delivery of the wire electrode 4. The delivery of the wire electrode 4 from the upper die guide fulcrum position 6 to the workpiece top surface 15 is obtained by using these functions. The deviation 35 can be calculated based on this delivery (distance from the workpiece top surface 15 to the upper die guide fulcrum position 6) and the taper angle. Further, the deviation 35 may be acquired based on data stored in the storage device described in the above item (1).

(3) The upper nozzle 36 (upper die guide fulcrum position 6) is moved with the wire electrode 4 being intermittently moved up and down along a projection (on the top surface of the workpiece 7) of an imaginary line that connects the upper die guide fulcrum position 6 of the upper die guide 5 and the lower die guide fulcrum position 8 of the lower die guide 9. The distance between a position where the delivery of the wire electrode 4 is changed and a position corresponding to a projection of the upper die guide fulcrum position 6 on the top surface of the workpiece 7 is obtained as the deviation 35.

(4) The working fluid is injected as the upper jet stream 22 from the upper nozzle 36 (FIG. 3). A pressure detector (not shown) for detecting pressure for the injection of the upper jet stream 22 is disposed in a working fluid supply line. The upper nozzle 36 (upper die guide fulcrum position 6) is moved along a projection (on the top surface (workpiece top surface 15) of the workpiece 7) of an imaginary line that connects the upper die guide fulcrum position 6 of the upper die guide 5 and the lower die guide fulcrum position 8 of the lower die guide 9. When the upper nozzle 36 reaches a position above the machined groove top end 14 of the taper-machined groove 23, the upper jet stream 22 enters the taper-machined groove 23. Therefore, no pressure acts on the injection of the upper jet stream 22, so that the pressure detected by the pressure detector is reduced. The distance between the position where the pressure of the upper jet stream 22 detected by the pressure detector is changed and the position corresponding to the projection of the upper die guide fulcrum position 6 on the top surface of the workpiece 7 is obtained as the deviation 35. A detection signal from the pressure detector is input to the controller 50.

According to the present invention, as described above, the breakage repair can be performed in the vicinity of the breakage position based on the large taper angle 20. If the distance (open distance) from the workpiece top surface 15 to the upper die guide fulcrum position 6 is short, however, the wire electrode 4 that hangs down around the machined groove top end 14 is so short that it becomes rigid. Because of the rigidity, the wire electrode 4 may sometimes fail to flexibly follow the taper angle 20 of the taper-machined groove 23 and may be caught by the inlet of the taper-machined groove 23 (see an edge portion 27 of FIG. 6).

The following is a description of two methods for solving this problem.

<Method of Synchronous Control>

The upper nozzle 36 (upper die guide fulcrum position 6) is controlled to be moved to the breakage position in synchronism with the threading of the wire electrode 4 into the taper-machined groove 23 during the automatic wire connection.

If the wire electrode 4 threaded into the machined groove top end 14 during die guide fulcrum position compensation is fed into the taper-machined groove 23 with the machining taper angle 20, the wire electrode 4 strongly touches the edge portion 27 of the machined groove top end 14 as it advances. Consequently, the wire electrode 4 suffers from curl attributable to excessive bending or cross-sectional deformation, surface scratching, etc., caused by rubbing, so that the connectability is reduced.

Figure 7:
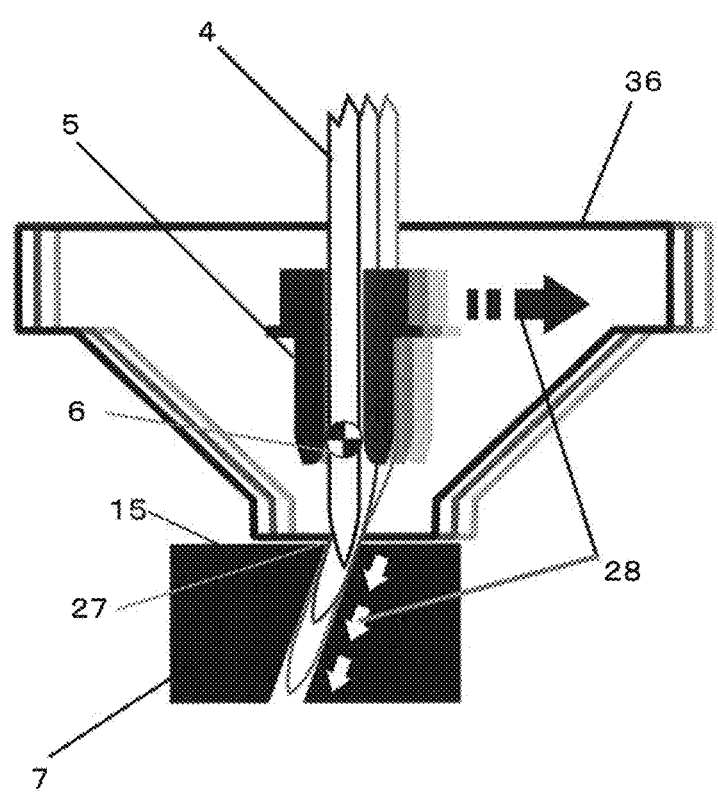
FIG. 7 is a view illustrating control that enables the wire electrode to flexibly follow the taper angle of the machined groove despite the rigidity of the wire electrode.

To avoid this problem, the upper die guide fulcrum position 6 is subjected to an operation 28 synchronous with the feeding speed of the wire electrode 4 as it is moved to the die guide fulcrum position based on the commanded taper angle 20 the moment the wire electrode 4 is threaded into the taper-machined groove 23 through the machined groove top end 14. In this way, the wire electrode 4 is kept from strongly touching the machined groove edge portion 27 (FIG. 7).

<Method of Raising Upper Nozzle for Predetermined Distance>

After the upper nozzle 36 is raised for a predetermined distance during the automatic wire connection, the wire electrode 4 is automatically connected. If the distance (open distance) from the workpiece top surface 15 to the upper die guide fulcrum position 6 is short, the wire electrode 4 that hangs down around the machined groove top end 14 is so short that it is rigid. Thus, the wire electrode 4 may sometimes fail to flexibly follow the large taper angle 20 of the taper-machined groove 23 and may be caught by the edge portion 27 of the taper-machined groove 23.

Figure 6:
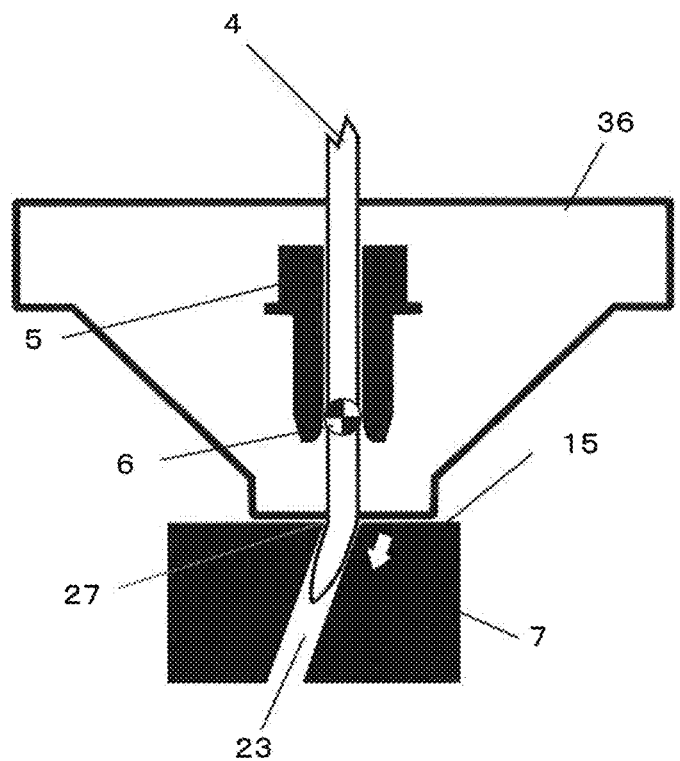
FIG. 6 is a view illustrating how the wire electrode having become rigid may sometimes fail to flexibly follow the taper angle of a machined groove and may be caught by the inlet of the tapered groove.
Figure 8:
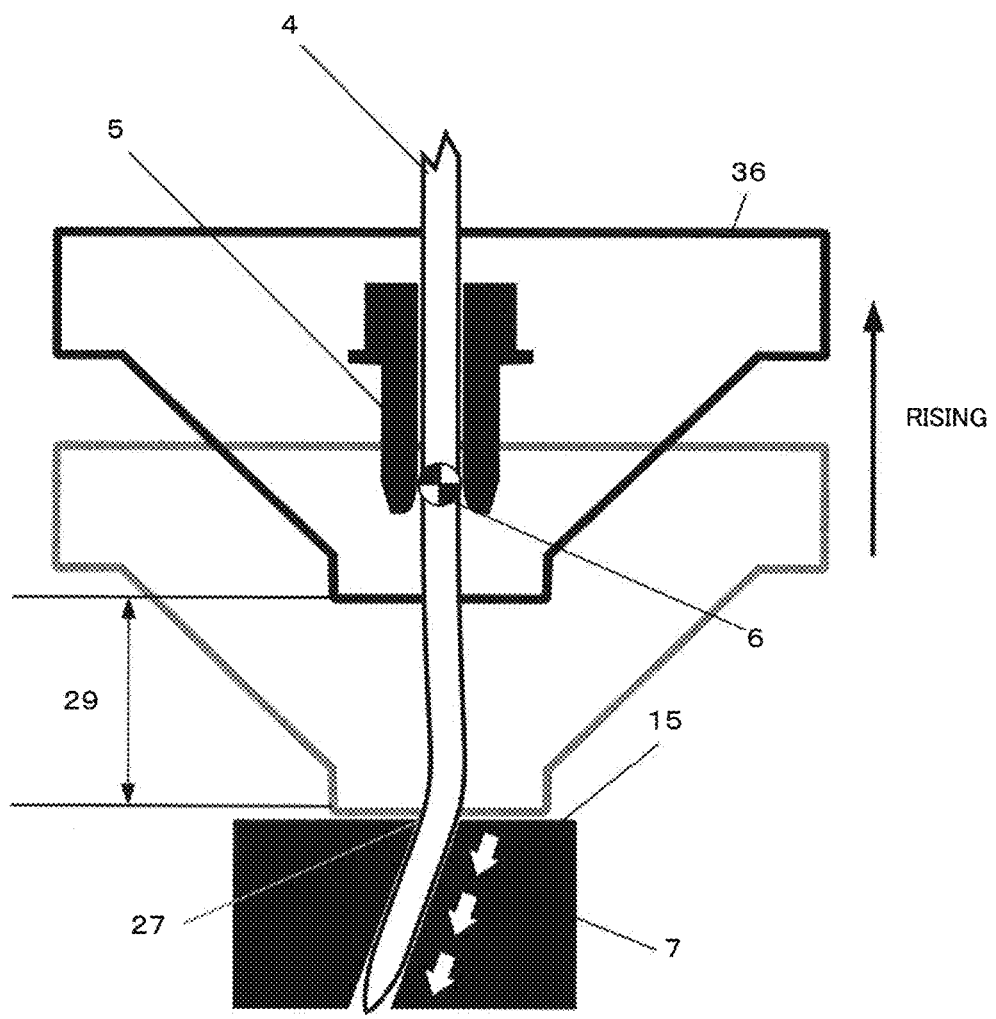
FIG. 8 is a view illustrating an embodiment in which the upper nozzle is raised for a predetermined distance for automatic connection of the wire electrode.

If the distance (open distance) from the machined groove top end 14 of the workpiece 7 to the upper die guide fulcrum position 6 is set to be short, therefore, the upper die guide fulcrum position 6, which is a connection start position, is moved up and down so as to secure an appropriate vertical movement distance that enables the wire electrode 4 to be fully flexibly threaded into the taper-machined groove 23 of the workpiece 7 through the machined groove top end 14. By doing this, the connection success rate based on the die guide fulcrum position movement compensating function and the reliability of the breakage repair in the vicinity of the breakage position during the taper machining can be further improved (FIGS. 6 and 8).

Figure 9:
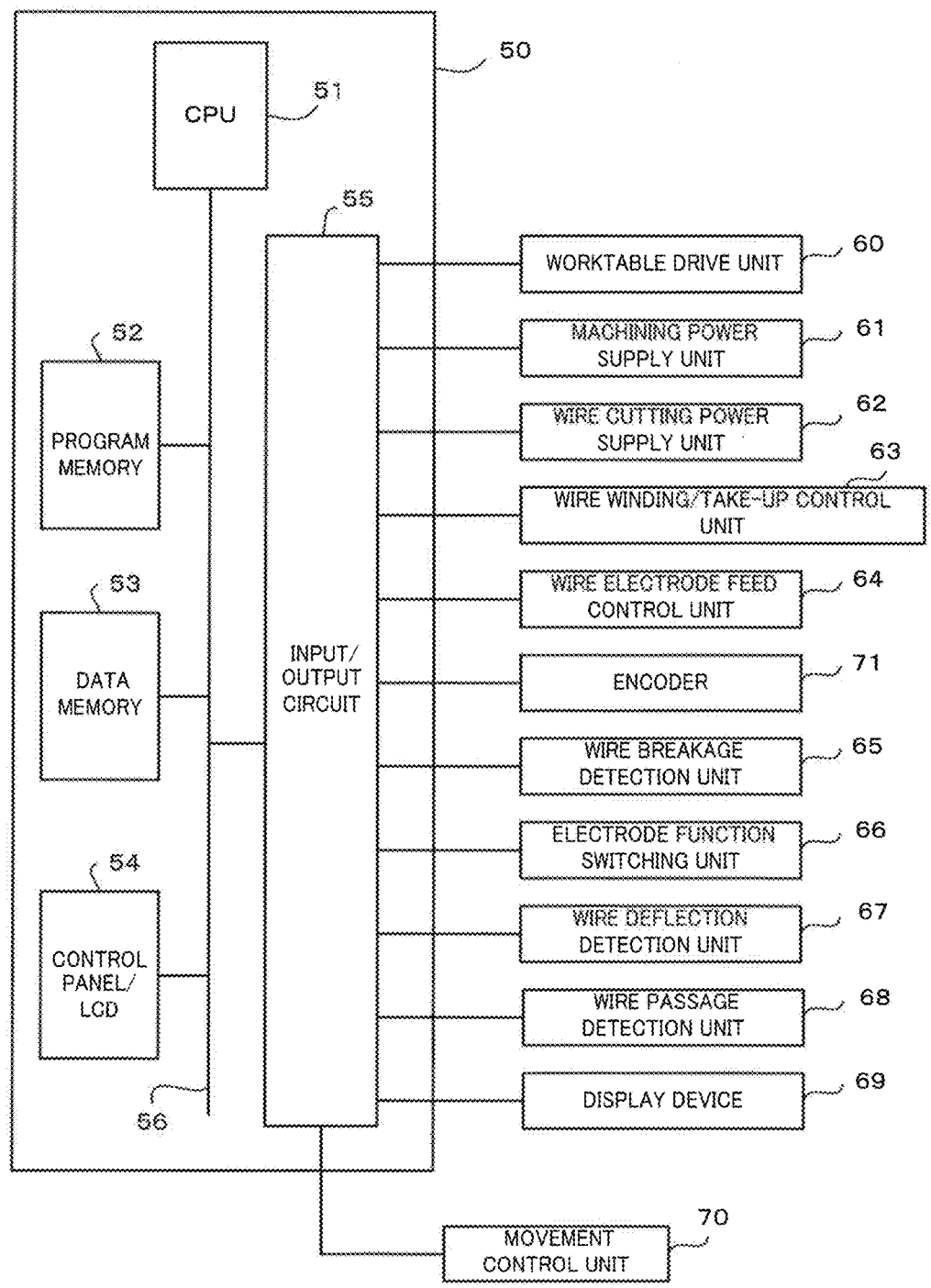
FIG. 9 is a block diagram of a controller of a wire electric discharge machine according to the present invention.

The controller of the wire electric discharge machine according to the present invention will now be described with reference to FIG. 9.

The controller 50 of the wire electric discharge machine comprises a central processing unit (hereinafter referred to simply as the "CPU") 51 composed of a microprocessor. The CPU 51 is connected with a program memory 52, data memory 53, control panel 54 with a liquid-crystal display (LCD), and input/output circuit 55 through a bus 56.

The program memory 52 is stored with various programs for controlling various parts of the wire electric discharge machine and the controller 50 itself of the wire electric discharge machine. Further, the data memory 53 is stored with position data incorporated in the machining program and various setup data that determine other machining conditions. Also, the data memory 53 is used as a storage device for temporary storage of data for various calculations performed by the CPU 51. Furthermore, the data memory 53 has a register area for calculating output pulses of an encoder 71 and a register area that stores data on locations of failure.

The input/output circuit 55 is connected with a worktable drive unit 60, a machining power supply unit 61, a wire cutting power supply unit 62, a wire winding/take-up control unit 63, a wire electrode feed control unit 64, and the encoder 71. The circuit 55 is also connected with a wire breakage detection unit 65, electrode function switching unit 66, wire deflection detection unit 67, wire passage detection unit 68, display device 69, and movement control unit 70 for controlling various other parts of the wire electric discharge machine.

The worktable drive unit 60 and the machining power supply unit 61 have a conventional configuration and are controlled by an ordinary method during execution of the machining. The wire cutting power supply unit 62 supplies necessary electric power to the upper and lower cutting electrodes 30 and 31 to cut the wire electrode 4 in a heating region in the AWF pipe 32 at the time of the wire connection. The wire winding/take-up control unit 63 drives a winding motor (not shown) and a motor (not shown) for driving a wire take-up roll.

The wire electrode feed control unit 64 drivingly controls a motor for driving the wire feed roller, and the rotation of this motor is detected by the encoder 71. The wire breakage detection unit 65 detects occurrence of breakage, if any, during the execution of the machining, which uses a conventional mechanism that detects, for example, current flowing through a wire electrode or the tension of a take-up roll.

The electrode function switching unit 66 serves to select the function of the upper and lower cutting electrodes 30 and 31 to any one of a wire cutting electrode and a wire passage detection electrode. When the wire electrode 4 is connected to a power supply for wire passage detection (not shown), the wire passage detection unit 68 detects the potential of the wire electrode 4. On the other hand, the wire deflection detection unit 67 is connected to an electrode for wire deflection detection (not shown) and detects the potential of this detection electrode. The contact/non-contact between the detection electrode and the wire electrode is determined by the change of the potential of the detection electrode.

The display device 69 serves to display wire fault location information in various forms and is used to, for example, give an alarm indication of the wire fault location on a real-time basis or graphically display the incidence of fault for each interval, based on a display program stored in the program memory 52. The movement control unit 70 for various parts is a collective expression of parts that control the opening-closing operations of the upper and lower cutting electrodes 30 and 31, descent of the AWF pipe 32 during the connection of the wire electrode 4, etc. One embodiment of the wire electric discharge machine according to the present invention comprises movement axes for moving the workpiece 7 relative to the wire electrode 4 in two axis directions on a horizontal plane (XY-plane) and movement axes for moving the upper nozzle 36 (upper die guide 5) in the U-axis direction (parallel to the X-axis direction) and the V-axis direction (parallel to the Y-axis direction). Further, the wire electric discharge machine may comprise a movement axis for moving the upper nozzle 36 (upper die guide 5) up and down in a direction (Z-axis direction) perpendicular to the horizontal plane.

Figure 10:
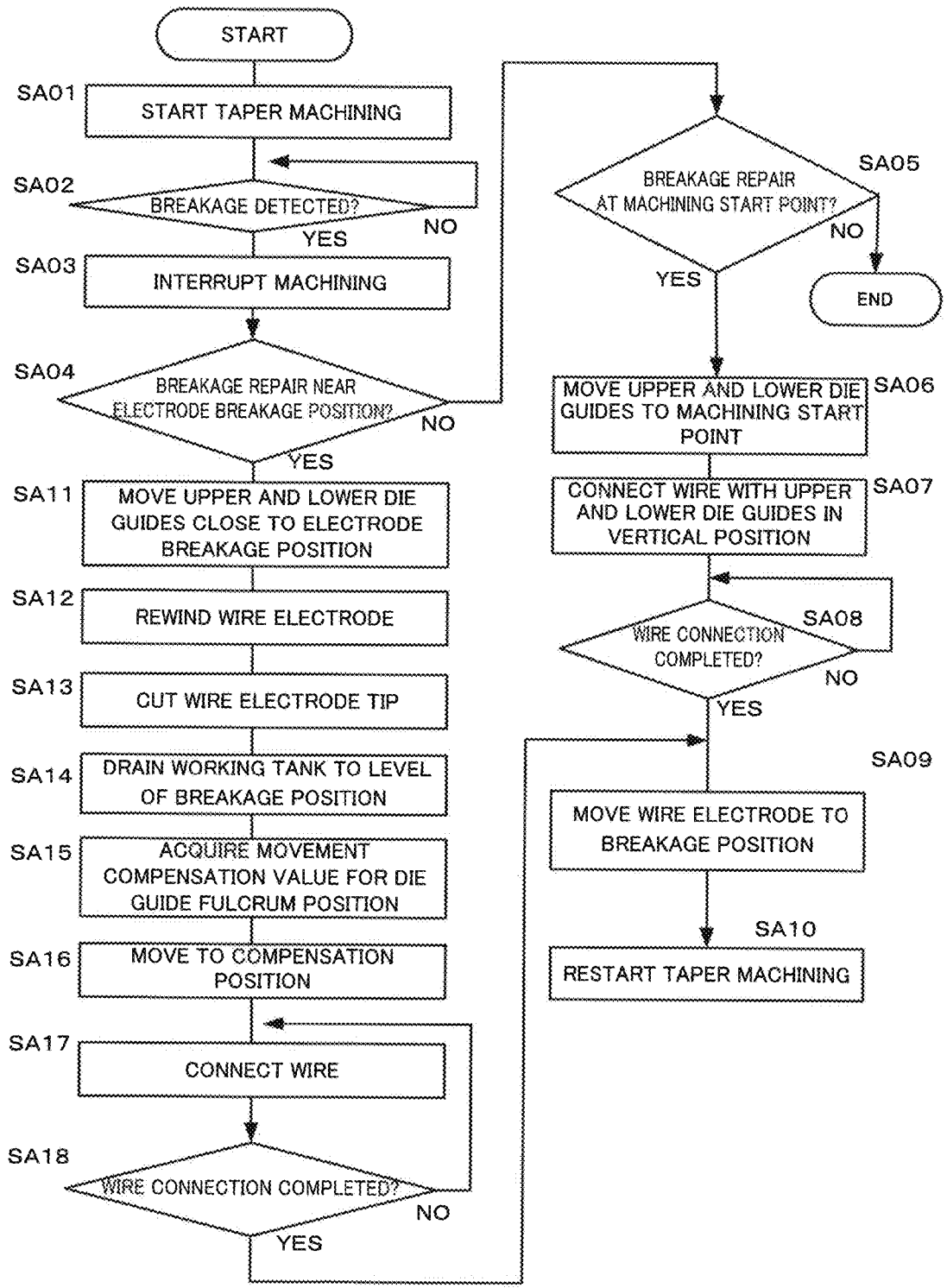
FIG. 10 is a flowchart illustrating the broken wire connecting operation in the vicinity of the breakage position in the taper machining.

The storage device of the controller 50 of the wire electric discharge machine is stored with programs for the execution of automatic wire connection processing shown in FIG. 10. Thus, the wire electric discharge machine can be said to comprise an automatic wire connection device.

FIG. 10 is a flowchart illustrating processing for broken wire connection performed in the vicinity of the breakage position in the taper machining. The following is a sequential description of steps of the processing.

[Step SA01] The taper machining is started.
[Step SA02] The occurrence of breakage is monitored. If the occurrence is detected (YES), the program proceeds to Step SA03.
[Step SA03] The machining is interrupted.
[Step SA04] It is determined whether or not the repair of detected breakage is set to be performed in the vicinity of the wire electrode breakage position. If the breakage repair is set to be performed in the vicinity of the breakage position (YES), the program proceeds to Step SA11. If not (NO), the program proceeds to Step SA05. Whether or not the repair of detected breakage is set to be performed in the vicinity of the wire electrode breakage position may be specified by the machining program or preset in the wire electric discharge machine.

[Step SA05] It is determined whether or not the repair of detected breakage is set to be performed at a machining start point (not in the vicinity of the wire electrode breakage position). If the breakage repair is set to be performed at the machining start point (YES), the program proceeds to Step SA06. If not (NO), this processing ends.

[Step SA06] The upper and lower die guides are moved to the machining start point.

[Step SA07] The upper and lower die guides are connected in a vertical position. Specifically, the upper and lower die guides are positioned so that the wire electrode is vertical, and the wire electrode is connected.

[Step SA08] When the connection of the wire electrode is completed, the program proceeds to Step SA09.

[Step SA09] The wire electrode is moved to the breakage position, whereupon the program proceeds to Step SA10. Specifically, the axes of the wire electric discharge machine are driven to move upper and lower die guide supporting positions (upper and lower die guides) on the wire electrode to positions at the time of the breakage.

[Step SA10] The taper machining is restarted.

[Step SA11] The wire electrode is moved close to the breakage position. Specifically, the axes of the wire electric discharge machine are drivingly controlled so that the upper and lower die guides are located in positions retracted a short distance along the machining trajectory from the breakage position where the wire electrode is broken on the machining path.

[Step SA12] The wire electrode is rewound.

[Step SA13] The tip of the wire electrode is cut.

[Step SA14] The working fluid in the working tank is discharged so that the fluid level of the tank is lowered to the level of the breakage position.

[Step SA15] A movement compensation value for the die guide fulcrum position is acquired.

[Step SA16] The upper die guide is moved to a compensated position.

[Step SA17] The wire connecting operation is performed.

[Step SA18] It is determined whether or not the wire connection is completed. If the wire connection is completed (YES), the program proceeds to Step SA09. If not (NO), the program returns to Step SA17.

The following is an additional description of the broken wire connection processing shown in the flowchart of FIG. 10.

After the wire electrode is moved close to the breakage position in Step SA11, the automatic connection of the wire electrode 4 can be performed (1) in the breakage position of the wire electrode 4, (2) in the position intermediate between the breakage position of the wire electrode 4 and the starting point of the machining block in which the wire electrode 4 is broken, or (3) in the position retracted a short distance along the machining trajectory from the wire electrode breakage position. The movement control of the upper and lower die guides 5 and 9 in Step SA11 is such a return control that the die guides are moved back a short distance along the machining trajectory from the breakage position of the wire electrode 4. This return control is generally known.

In Step SA16, the upper die guide is moved to the compensated position. If the upper die guide 5 moves from the position corresponding to the projection of the upper die guide fulcrum position 6 of the wire electrode 4 on the workpiece top surface 15 to the position (more specifically, the central position) of the machined groove top end 14 of the taper-machined groove 23, as mentioned before, then the upper nozzle 36 (upper die guide fulcrum position 6) moves relative to the workpiece 7 along a projection of the imaginary line that connects the upper and lower die guide fulcrum positions 6 and 8. As the upper die guide 5 moves in this manner, the upper nozzle 36 (upper die guide fulcrum position 6) moves relative to the machined groove top end 14 of the taper-machined groove 23.

According to the above-described methods (3) and (4) in which the deviation 35 on the workpiece top surface 15 between the wire electrode hanging position 18 and the machined groove top end 14 of the workpiece top surface 15 is obtained, the position of the upper nozzle 36 (upper die guide fulcrum position 6) is compensated when the machined groove top end 14 is detected, and the wire connecting operation is started.

In the conventional breakage repair during the taper machining, an applicable range of the taper angle 20 is narrow. If the machining taper angle 20 is increased, therefore, it is necessary to return the wire electrode to a machining start point to perform wire connection there and, after completion of wire connection, return the wire electrode to the breakage point along the machined groove. Such a reciprocating motion of the wire electrode takes time and the edge of the taper-machined groove or the like may possibly cause another breakage of the wire electrode in the middle of the return, thereby hindering prolonged continuation of a sophisticated automatic operation.

As the present invention has a movement compensating function to move the upper die guide fulcrum position 6, the breakage can be repaired in the vicinity of the breakage position during the taper machining using the larger machining taper angle 20. In this way, the reliability of the automatic operation of the wire electric discharge machine in the field of taper machining is improved, and the time required for repair of the breakage can be reduced. Thus, the total machining time can be reduced, so that the application field of the wire electric discharge machine can be extended.

The invention claimed is:

1. A wire electric discharge machine with an automatic wire connecting function, in which the wire electric discharge machine comprises an upper nozzle and a lower nozzle which support a wire electrode and in which an upper die guide and a lower die guide are included, respectively, and the wire electrode and a workpiece are moved relative to each other to machine the workpiece and, if the wire electrode is broken during machining, then the wire electrode is guided for automatic wire connection by a jet stream injected through a nozzle hole of the upper nozzle, the wire electric discharge machine comprising:
   deviation acquisition unit that acquires, as a deviation, a distance from a position on a top surface of the workpiece where the wire electrode is hung from the upper die guide to a top end position of a machined groove formed by the machining, and
   automatic wire connection execution unit that moves the upper nozzle by a distance equivalent to the acquired deviation, thereby performing the automatic wire connection,
   wherein the deviation acquisition unit causes the upper nozzle to move on a projection, on the top surface of the workpiece, of an imaginary line which connects an upper die guide fulcrum position of the upper die guide and a lower die guide fulcrum position of the lower die guide, while intermittently moving the wire electrode up and down, and a distance between a position where a delivery length of the wire electrode is changed and a position corresponding to the upper die guide fulcrum position on the projection on the top surface of the workpiece is acquired as the deviation.

2. The wire electric discharge machine with an automatic wire connecting function according to claim 1, wherein the deviation acquisition unit comprises pressure detection unit that detects a pressure of the jet stream injected from the upper nozzle and causes the upper nozzle to move along a projection, on the top surface of the workpiece, of an imaginary line which connects the upper die guide fulcrum position of the upper die guide and the lower die guide fulcrum position of the lower die guide, and a distance between a position where the pressure from the pressure detection means is changed and a position corresponding to the upper die guide fulcrum position on the projection on the top surface of the workpiece is acquired as the deviation.

\* \* \* \* \*